US006872761B2

(12) United States Patent
LeStarge

(10) Patent No.: US 6,872,761 B2
(45) Date of Patent: Mar. 29, 2005

(54) COMPOSITIONS FOR ACOUSTIC-DAMPING COATINGS

(75) Inventor: Kevin J. LeStarge, Menomonee Falls, WI (US)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 47 days.

(21) Appl. No.: 10/422,136

(22) Filed: Apr. 24, 2003

(65) Prior Publication Data

US 2004/0211934 A1 Oct. 28, 2004

(51) Int. Cl.[7] .............................. C08K 7/22; C08J 9/16; B05D 3/02

(52) U.S. Cl. ....................... 523/218; 427/195; 427/373; 521/59; 521/62

(58) Field of Search ............................ 523/218; 521/59, 521/62; 427/195, 373

(56) References Cited

U.S. PATENT DOCUMENTS

| | | | | | |
|---|---|---|---|---|---|
| 3,615,972 | A | | 10/1971 | Morehouse, Jr. et al. | |
| 4,005,033 | A | * | 1/1977 | Georgeau et al. | 521/59 |
| 4,325,858 | A | | 4/1982 | Saito et al. | |
| 4,350,782 | A | | 9/1982 | Küchler et al. | |
| 4,431,689 | A | | 2/1984 | Günter | |
| 4,946,737 | A | * | 8/1990 | Lindeman et al. | 442/417 |
| 5,264,467 | A | * | 11/1993 | DiStefano | 523/218 |
| 5,274,006 | A | | 12/1993 | Kagoshima et al. | |
| 5,356,957 | A | | 10/1994 | Nanri et al. | |
| 5,520,961 | A | | 5/1996 | Lysell et al. | |
| 5,618,859 | A | | 4/1997 | Maeyama et al. | |
| 5,629,364 | A | | 5/1997 | Malmbom et al. | |
| 5,658,969 | A | | 8/1997 | Gerace | |
| 5,935,655 | A | * | 8/1999 | Beleck | 427/380 |
| 6,040,350 | A | | 3/2000 | Fukui | |
| 6,531,541 | B1 | * | 3/2003 | Desai et al. | 524/832 |
| 2002/0019480 | A1 | * | 2/2002 | Munro et al. | 524/589 |

FOREIGN PATENT DOCUMENTS

| | | |
|---|---|---|
| EP | 559254 | 9/1993 |
| WO | WO/93/24581 | 12/1993 |

* cited by examiner

*Primary Examiner*—Peter Szekely
(74) *Attorney, Agent, or Firm*—Stephan D. Harper

(57) ABSTRACT

The presence of expandable microspheres in an aqueous coating composition comprised of at least one dispersed polymer and at least one inorganic filler helps to improve the appearance and/or sound damping properties of the coating obtained by heating the aqueous coating composition after it has been applied to a substrate surface.

18 Claims, No Drawings

COMPOSITIONS FOR ACOUSTIC-DAMPING COATINGS

BACKGROUND OF THE INVENTION

1. Field of the Invention

The present invention pertains to water-based compositions useful for forming acoustic- and vibration-damping coatings on substrates, particularly relatively thin, rigid materials such as sheet metal. In particular, the invention relates to compositions containing water, dispersed particles of one or more polymers, one or more particulate inorganic fillers, and expandable microspheres.

2. Discussion of the Related Art

To suppress the noise often created by the vibration of certain substrates such as those employed in the construction of vehicles, machines, marine craft, building materials and components, appliances, and the like, various aqueous vibration-damping coatings have been developed. Such coatings are recognized as having the advantages of being easy and relatively safe to handle and apply, since they generally do not contain large amounts of hazardous, volatile, or flammable organic solvents. However, the surface appearance of such coatings when applied to the substrate surface and dried or cured is often less than completely satisfactory. Very commonly, the coating surface is rough and uneven. Additionally, the damping characteristics of the water-based coatings are such that a relatively thick coating is required in order to suppress the noise and vibration to the desired extent. In addition to being less economical, the use of relatively thick coatings tends to further worsen the surface appearance problems typically encountered with such coatings.

SUMMARY OF THE INVENTION

It has now been found that acoustic damping coatings having improved surface appearance and/or noise-suppression properties can be provided by the use of aqueous compositions containing at least one polymer in dispersed form, at least one particulate inorganic filler, and expandable microspheres. The expandable microspheres increase in volume when the substrate coated with a layer of the aqueous composition is heated to dry the aqueous composition, thereby providing a final coating surface that is smoother than a coating surface obtained in the absence of the expandable microspheres. The sound transmission properties of the dried coating are also enhanced by the presence of the expandable microspheres.

DETAILED DESCRIPTION OF THE INVENTION

The aqueous coating compositions of the present invention contain an amount of expandable microspheres effective to improve the surface appearance of the coating formed by heating and drying the composition and/or improve the sound or vibration damping properties of the coating. Expandable microspheres are well known to workers in the field and generally comprise small diameter polymeric shells or bubbles which encapsulate one or more volatile substances such as light hydrocarbons (e.g., propane, n-butane, isobutane, isopentane, n-pentane, neopentane, hexane, heptane, petroleum ether) and halocarbons (e.g., methyl chloride, methylene chloride, trichlorofluoromethane, dichlorodifluoromethane). The outer shells are usually thermoplastic in character to permit softening and expansion of the expandable microspheres when heated due to volatilization of the substances trapped within the shells. The polymers used in the shells may be linear, branched, or cross-linked and may be comprised of acrylic resins (e.g., polymethylmethacrylate), styrenic resins (e.g., acrylic-modified polystyrene, styrene/methylmethacrylate copolymer), polyvinylidene chloride, nitrile polymers or copolymers (e.g., acrylonitrile/vinylidene chloride/methylmethacrylate copolymer, acrylonitrile/methacrylonitrile/methylmethacrylate copolymer), and the like. The expandable microspheres may be prepared using methods known in the art such as the procedures described, for example, in U.S. Pat. No. 3,615,972. Suitable expandable microspheres are also available from commercial sources, such as the products sold under the trademark “EXPANCEL” by Casco Nobel AB or Akzo Nobel. The average particle size of the microspheres and temperature at which expansion of the microspheres begins are not believed to be particularly critical. Generally speaking, however, the microspheres will have weight average particle sizes in the range of from about 5 to about 50 microns and Tstart temperatures (as measured by thermomechanical analysis) in the range of from about 70 degrees C. to about 140 degrees C. Mixtures of different expandable microspheres having different average particle sizes and/or different expansion properties may be employed.

The polymers suitable for use in the present invention are in dispersed (emulsified) form and may be selected from any of the polymeric materials conventionally used in aqueous compositions capable of forming vibration and/or damping coatings on substrate surfaces. Preferred polymers include dispersions of a homopolymer or copolymer of a diolefin such as 1,3-butadiene, cyclobutadiene, and/or isoprene. The comonomer may preferably be selected from vinyl aromatic compounds such as, for example, styrene or alpha-methyl styrene, acrylonitrile, as well as other ethylenically unsaturated monomers. Acrylate polymers and copolymers (sometimes referred to in the art as acrylic resins) such as, for example, copolymers of lower alkyl (meth)acrylates such as n-butyl acrylate with comonomers such as styrene and/or acrylonitrile are also preferred for use. Preferably, the aqueous compositions of the present invention do not contain any polymers containing chlorine such as, for example, polyvinyl chloride or polyvinylidene chloride. In one preferred embodiment, at least a portion of the polymer component of the aqueous coating composition is a polyurethane dispersion. Mixtures of the aforedescribed polymers may be used and may be preferred for purposes of obtaining the desired combination of properties in the final cured coating. For example, different polymers having different glass transition temperature characteristics may be used in combination. Generally speaking, the polymers used in the present invention typically have glass transition temperatures in the range of from about 0 degrees C. to about 90 degrees C. However, in one embodiment of the invention a combination of polymers is used wherein one polymer has a $T_g$ greater than 0 degrees C. (e.g., 15 to 35 degrees C.) and another polymer is elastomeric and has a $T_g$ less than 0 degrees C. (e.g., −10 to −30 degrees C.). In this embodiment, the weight ratio of high $T_g$ polymer to low $T_g$ polymer is from about 3:1 to about 10:1. The two polymers may, for example, both be acrylic resins having different monomer compositions selected to provide the desired $T_g$ characteristics.

One or more inorganic fillers in particulate form are incorporated into the aqueous compositions of the present invention for the purpose of providing bulk to the dried coating, adjusting the hardness of the dried coating, improving the sound or vibration damping properties of the dried coating, controlling blistering of the dried coating, and/or modifying the flammability of the dried coating, among other purposes. The inorganic filler(s) may be in any suitable form such as powder, fibrous, needle-like, scale-like, spherical, plate-like, and other shapes known in the art and should be insoluble in water. Examples of inorganic fillers suitable for use include, but are not limited to, calcium carbonate, silica, alumina, kaolin, clay, talc, mica, diatomaceous earth, glass powder or fibers, aluminum hydroxide, perlite, barium sulfate, magnesium carbonate, calcium dihydrate, rock wool, asbestos, wollastonite, zeolite, glass or ceramic microspheres, graphite, and the like and mixtures thereof. Organic fillers such as polymeric fibers, vulcanized or cross-linked rubber particles and the like may also be used.

One or more organic solvents (preferably, water-miscible organic solvents) may additionally be present in the aqueous coating compositions. Such solvents may include, for example, alcohols, amines, ketones, esters and the like. However, it will generally be preferred to avoid the use of any relatively volatile organic solvents, e.g., solvents having boiling points less than 100 degrees C. at atmospheric pressure or solvents forming azeotropes with water having boiling points less than 100 degrees C. at atmospheric pressure. The aqueous compositions of the present invention thus preferably are free of such volatile organic solvents. However, relatively high boiling water-miscible solvents such as glycols and glycol oligomers such as propylene glycol, dipropylene glycol, tripropylene glycol and the like as well as mono-ethers of glycols and glycol oligomers (e.g., alkyl mono-ethers where the alkyl group is a $C_1$–$C_6$ alkyl group) are advantageously utilized in certain embodiments of the invention for purposes of controlling the drying rate of the aqueous coating composition following its application to a substrate surface.

The aqueous coating composition may also include a surfactant or mixture of surfactants (which may function as wetting agents). Suitable surfactants include non-ionic surfactants such as, for example, block copolymers of ethylene oxide and propylene oxide.

One or more thickeners (sometimes referred to in the art as rheology modifiers) may be employed to modify the viscosity or theological characteristics of the aqueous coating composition so as to inhibit it from running off or dripping from a substrate surface that is not horizontal and to permit the formation of a wet coating of the desired thickness. Any of the standard thickeners known for this purpose in the aqueous coating art may be utilized, including, for example, carboxy methyl cellulose (including salts thereof) and other polysaccharide derivatives and organically modified clays.

The aqueous coating composition may also comprise one or more colorants if so desired, such as, for example, carbon black, titanium dioxide and the like.

Additional optional components of the aqueous composition of the present invention include, but are not limited to, dispersing agents (inorganic as well as organic), viscosity improvers/modifiers, preservatives, anti-oxidants, plasticizers, pH control agents (e.g., acids, bases, buffering agents), corrosion inhibitors, fungicides, ultraviolet absorbers, antistatic agents, and the like.

The aqueous composition preferably has a pH in the range of from about 7.5 to about 9.0 and independently preferably has a viscosity at room temperature (i.e., about 20–25 degrees C.) in the range of from about 10 to about 300 poise.

The preferred amounts of the different components which may comprise the aqueous composition of the present invention are as follows:

| Component | Preferred Weight % | More Preferred Weight % |
|---|---|---|
| Total Polymer | 10–30 | 12–25 |
| Polyurethane | 0–5 | 0.2–3 |
| Water | 8–30 | 12–25 |
| Filler | 30–65 | 40–60 |
| Expandable Microspheres | 0.5–5 | 0.8–3 |
| Surfactant | 0–1 | 0.1–0.6 |
| Glycol/Glycol Ether | 0–25 | 5–20 |
| Defoamer | 0–1 | 0.1–0.5 |
| Thickener | 0–1 | 0.1–0.8 |

The substrates to which the aqueous coating composition may be applied are not particularly limited but include (without limitation) metal sheets, plated metal sheets, conversion-coated metal sheets, metal sheets already coated with a coating other than the coatings described herein, and the like. The metal may comprise, for example, steel, iron, aluminum, and/or zinc. The substrate may alternatively be comprised of a polymeric substance such a thermoplastic or thermoset.

Application of the aqueous coating composition may be carried out by any of the conventional methods or techniques known in the coating art such as, for example, brush coating, spray coating (including airless spray coating), dipping, and roller coating. The thickness of the applied coating is not believed to be critical and is normally adjusted such that the final dried coating is effective in suppressing noise and vibration transmission to the desired extent. Typically, the dried coating is at least about 1000 microns thick, with thicknesses in the range of from about 2000 to about 5000 microns generally being sufficient. After the aqueous coating composition has been applied to the substrate surface, it may first be permitted to dry partially at ambient or slightly elevated temperature, following by heating of the coated substrate. Drying of the coating can be performed by any suitable method such as oven drying or induction heating, provided the wet coating is exposed to a temperature effective to activate expansion of the expandable microspheres. This minimum drying temperature will, of course, vary depending upon the characteristics of the particular expandable microspheres selected for use, but may be readily determined by reference to the Tstart values of the expandable microspheres. Typically, however, the drying temperature will be in the range of from about 70 degrees C. to about 200 degrees C.

EXAMPLES

The following examples illustrate, without limitation, various embodiments of the aqueous coating compositions of the present invention. The amounts listed for the components of the compositions are in weight percent.

Example 1

| | |
|---|---|
| Polymer Dispersion A[1] | 30.9 |
| Polymer Dispersion B[2] | 7.4 |
| Polymer Dispersion C[3] | 2.1 |
| Surfactant[4] | 0.3 |

-continued

| | |
|---|---|
| Filler A[5] | 21.4 |
| Filler B[6] | 10.8 |
| Filler C[7] | 10.9 |
| Expandable Microspheres[8] | 0.4 |
| Defoamer[9] | 0.3 |
| Thickener[10] | 0.4 |
| Glycol[11] | 15.0 |

[1]ACRONAL 296D aqueous dispersion of styrene/butyl acrylate copolymer, 49–51% solids, Tg 22 degrees C., obtained from BASF
[2]ACRONAL S760 aqueous dispersion of styrene/butadiene copolymer, 49–51% solids, Tg 22 degrees C., obtained from BASF
[3]INCOREZ W830/404 polyurethane dispersion in water, obtained from Industrial Copolymers, Ltd.
[4]PLURONIC F87 polyoxypropylene-polyoxyethylene block copolymer, 7700 MW, obtained from BASF
[5]HUBERCARB Q325 ground limestone, obtained from Huber
[6]MP1225 talc (magnesium silicate hydrate), obtained from Mineral Technologies
[7]GP 076 graphite
[8]EXPANCEL DU 551 expandable microspheres, 10–16 micron ave. particle size, obtained from Akzo Nobel
[9]FOAMASTER NXZ, obtained from Cognis Corporation
[10]AKUCELL AF 0305 sodium carboxymethyl cellulose, obtained from Akzo Nobel
[11]tripropylene glycol

| | Example 2 | Example 3 |
|---|---|---|
| Polymer Dispersion A[1] | 30.9 | 33.0 |
| Polymer Dispersion B[2] | 7.4 | 7.9 |
| Polymer Dispersion C[3] | 2.1 | 2.3 |
| Glycol[4] | 15.0 | 7.5 |
| Surfactant[5] | 0.3 | 0.4 |
| Filler A[6] | 32.2 | — |
| Filler B[7] | 10.8 | 3.5 |
| Colorant[8] | 0.2 | 0.2 |
| Expandable Microspheres[9] | 1.0 | 2.0 |
| Defoamer[10] | 0.3 | 0.3 |
| Thickener[11] | 0.4 | 0.4 |
| Filler C[12] | — | 14.5 |
| Filler D[13] | — | 20.0 |

[1]ACRONAL 296D aqueous dispersion of styrene/butyl acrylate copolymer, obtained from BASF
[2]ACRONAL S760 aqueous dispersion of styrene/butadiene copolymer, obtained from BASF
[3]INCOREZ W830/404 aqueous polyurethane dispersion, obtained from Industrial Copolymers, Inc.
[4]tripropylene glycol
[5]PLURONIC F87 polyoxypropylene-polyoxyethylene block copolymer, obtained from BASF
[6]MP1225 talc (magnesium silicate hydrate), obtained from Mineral Technologies
[7]CD2200 wet ground mica (hydrous potassium aluminum silicate), obtained from Kraft Chemical Co.
[8]RAVEN H2O carbon black, obtained from Columbian Chemicals Co.
[9]EXPANCEL DU 551 expandable microspheres, obtained from Akzo Nobel
[10]FOAMASTER NXZ, obtained from Cognis Corporation
[11]carboxymethyl cellulose
[12]GP 076 natural graphite, obtained from Asbury Graphite Mills, Inc.
[13]CD-2200 wet ground mica, obtained from Kraft Chemical Co.

Example 4

| | |
|---|---|
| Polymer Dispersion A[1] | 2.3 |
| Polymer Dispersion B[2] | 35.9 |
| Surfactant[3] | 0.4 |
| Glycol[4] | 7.5 |
| Colorant[5] | 0.2 |
| Expandable Microspheres[6] | 2.0 |
| Filler A[7] | 14.5 |
| Filler B[8] | 25.0 |
| Filler C[9] | 8.1 |
| Filler D[10] | 3.5 |
| Defoamer | 0.3 |
| Thickener[11] | 0.4 |

[1]INCOREZ W830/404 polyurethane dispersion, obtained from Industrial Copolymers Ltd.
[2]ACRONAL S504 n-butyl acrylate/acrylonitrile/styrene copolymer dispersion (ca. 50 wt. % solids), Tg 4 C., obtained from BASF
[3]PLURONIC F87 polyoxypropylene-polyoxyethylene block copolymer, obtained from BASF
[4]tripropylene glycol
[5]RAVEN H2O carbon black, obtained from Columbian Chemicals Co.
[6]EXPANCEL DU 551 expandable microspheres, obtained from Akzo Nobel
[7]TALCRON MP 44-26 talc, obtained from Barretts Minerals Inc.
[8]HUBERBRITE barium sulphate (baryte), obtained from Huber Engineered Materials
[9]GP 076 natural graphite, obtained from Asbury Graphite Mills, Inc.
[10]CD-2200 wet ground mica, obtained from Kraft Chemical Co.
[11]carboxymethyl cellulose

Example 5

| | |
|---|---|
| Polymer Dispersion A[1] | 26.54 |
| Polymer Dispersion B[2] | 5.05 |
| Surfactant[3] | 0.78 |
| Dipropylene Glycol | 3.90 |
| Carbon Black[4] | 0.27 |
| Dolomite[5] | 53.45 |
| Expandable Microspheres[6] | 2.00 |
| Mica[7] | 5.05 |
| Preservative[8] | 0.15 |
| Defoamer[9] | 0.41 |
| Propylene Glycol Monomethyl Ether | 0.21 |
| Dipropylene Glycol Monomethyl Ether | 1.21 |
| Ammonia (26%) | 0.21 |
| Rheological Additive[10] | 0.79 |

[1]JONCRYL R5859 acrylic emulsion (40 weight % solids; $T_g$ = 26 degrees C.), obtained from Johnson Polymers
[2]JONCRYL R5888 elastomeric acrylic emulsion (50 weight % solids; $T_g$ = −21 degrees C.), obtained from Johnson Polymers
[3]DISPERBYK 181 wetting additive (65% non-volatiles; described by supplier as solution of alkylol ammonium salt of a polyfunctional polymer with anionic/non-ionic character), obtained from Byk Chemie
[4]RAVEN H2O carbon black, obtained from Columbian Chemicals Co.
[5]DOLFL 50/90 dolomite, obtained from Canada Talc
[6]EXPANCEL DU 551 expandable microspheres, obtained from Akzo Nobel
[7]CD 2200 mica, obtained from Kraft Chemical Company
[8]DOWACIL 75 preservative, obtained from The Dow Chemical Company
[9]FOAMASTER NXZ defoamer, obtained from Cognis Corporation
[10]BENAQUA 4000 rheological additive (organically modified clay (hectorite) in powder form), obtained from Elementis Specialties

What is claimed is:

1. A composition useful for forming an acoustic or vibration damping coating on a substrate surface, said composition comprising (a) from 8 to 30 weight percent water, (b) from 10 to 30 weight percent of at least two polymers in dispersed form, wherein at least one polymer I has a $T_g$ greater than 0 degrees C. and at least one polymer II is elastomeric and has a $T_g$ less than 0 degrees C. and the weight ratio of polymer I:polymer II is from about 3:1 to about 10:1, (c) from 30 to 65 weight percent of at least one particulate inorganic filler, and (d) from 0.5 to 5 weight percent expandable microspheres having a weight average particle size in the range of from about 5 to about 50 microns and a Tstart temperature in the range of from about 70 degrees C. to about 140 degrees C.

2. The composition of claim 1 wherein at least one polymer is selected from the group consisting of styrene/acrylate copolymers, styrene/butadiene copolymers, and polyurethanes.

3. The composition of claim 1 additionally comprising at least one thickener.

4. The composition of claim 1 additionally comprising at least one glycol.

5. The composition of claim 1 additionally comprising at least one surfactant.

6. The composition of claim 1 additionally comprising at least one defoamer.

7. The composition of claim 1 additionally comprising at least one colorant.

8. The composition of claim 1 wherein at least one particulate inorganic filler is selected from the group consisting of mica, talc, calcium carbonate, graphite, barium sulfate, dolomite, and limestone.

9. The composition of claim 1 comprising from about 0.8 to about 3 weight % expandable microspheres.

10. The composition of claim 1 wherein at least one polymer is a polyurethane.

11. The composition of claim 1 wherein at least one polymer is a copolymer of styrene and 1,3-butadiene.

12. The composition of claim 1 wherein at least one polymer is a copolymer of styrene, n-butyl acrylate, and, optionally, acrylonitrile.

13. The composition of claim 1 wherein at least one polymer is an acrylic resin having a $T_g$ of from about 0 degrees C. to about 40 degrees C.

14. A method of forming an acoustic or vibration damping coating on a substrate surface, said method comprising (a) forming a layer of the composition of claim 1 on said substrate surface and (b) heating said layer for a time and at a temperature effective to dry said layer and to cause said expandable microspheres to increase in volume.

15. A composition useful for forming an acoustic or vibration damping coating on a substrate surface, said composition comprising (a) about 10 to about 30 weight percent of at least two polymers in dispersed form selected from the group consisting of acrylic resins, styrene/butadiene copolymers, polyurethanes and mixtures thereof, wherein at least one polymer I has a $T_g$ greater than 0 degrees C. and at least one polymer II is elastomeric and has a $T_g$ less than 0 degrees C. and the weight ratio of polymer I:polymer II is from about 3:1 to about 10:1, (b) about 8 to about 30 weight percent water, (c) about 30 to about 65 weight percent of one or more particulate inorganic fillers selected from the group consisting of mica, talc, calcium carbonate, graphite, barium sulphate, dolomite, limestone and mixtures thereof, and about 0.5 to about 5 weight percent expandable microspheres microspheres having a weight average particle size in the range of from about 5 to about 50 microns and a Tstart temperature in the range of from about 70 degrees C. to about 140 degrees C.

16. A method of forming an acoustic or vibration damping coating on a thin, rigid substrate surface, said method comprising (a) forming a layer of the composition of claim 15 on said substrate surface and (b) heating said layer for a time and at a temperature effective to dry said layer and to cause the expandable microspheres to increase in volume.

17. A composition useful for forming an acoustic or vibration damping coating on a substrate surface, said composition comprising (a) about 12 to about 25 weight percent of at least two polymers in dispersed form selected from the group consisting of acrylic resins, styrene/butadiene copolymers, polyurethanes and mixtures thereof, wherein at least one polymer I has a $T_g$ greater than 0 degrees C. and at least one polymer II is elastomeric and has a $T_g$ less than 0 degrees C. and the weight ratio of polymer I:polymer II is from about 3:1 to about 10:1, (b) about 12 to about 25 weight percent water, (c) about 40 to about 60 weight percent of one or more particulate inorganic fillers selected from the group consisting of mica, talc, calcium carbonate, graphite, barium sulphate, dolomite, limestone and mixtures thereof, (d) about 0.8 to about 3 weight percent expandable microspheres having a Tstart of from about 70 to about 140 degrees C. microspheres and a weight average particle size in the range of from about 5 to about 50 microns, (e) about 0.1 to about 0.6 weight percent of one or more surfactants, (f) about 5 to about 20 weight percent of one or more water-miscible solvents selected from the group consisting of glycols, glycol oligomers, mono-alkyl ethers of glycols, mono-alkyl ethers of glycol oligomers, and mixtures thereof, (g) about 0.1 to about 0.5 weight percent of one or more defoamers, and (h) about 0.1 to about 0.8 weight percent of one or more thickeners.

18. A method of forming an acoustic or vibration damping coating on a metal substrate surface, said method comprising (a) forming a layer of the composition of claim 15 on said metal substrate surface and (b) heating said layer for a time and at a temperature effective to dry said layer and to cause said expandable microspheres to increase in volume, said layer being sufficient to provide a thickness when dry and expanded of from about 1000 to about 5000 microns.

* * * * *

UNITED STATES PATENT AND TRADEMARK OFFICE
CERTIFICATE OF CORRECTION

PATENT NO. : 6,872,761 B2 
DATED : March 29, 2005
INVENTOR(S) : LeStarge

It is certified that error appears in the above-identified patent and that said Letters Patent is hereby corrected as shown below:

Title page,
Item [74], *Attorney, Agent, or Firm*, delete “Stephan” and insert -- Stephen --.

Column 8,
Line 1, delete “microspheres”.

Signed and Sealed this

Eleventh Day of April, 2006

JON W. DUDAS
*Director of the United States Patent and Trademark Office*